(12) United States Patent
Takashima et al.

(10) Patent No.: US 10,940,556 B2
(45) Date of Patent: Mar. 9, 2021

(54) AUTOMOTIVE MEMBER HAVING RESISTANCE WELD

(71) Applicant: JFE Steel Corporation, Tokyo (JP)

(72) Inventors: Katsutoshi Takashima, Tokyo (JP); Hiroshi Matsuda, Tokyo (JP); Rinsei Ikeda, Tokyo (JP); Yoshiyasu Kawasaki, Tokyo (JP)

(73) Assignee: JFE Steel Corporation, Tokyo (JP)

( * ) Notice: Subject to any disclaimer, the term of this patent is extended or adjusted under 35 U.S.C. 154(b) by 76 days.

(21) Appl. No.: 16/323,570

(22) PCT Filed: Aug. 21, 2017

(86) PCT No.: PCT/JP2017/029761
§ 371 (c)(1),
(2) Date: Feb. 6, 2019

(87) PCT Pub. No.: WO2018/038045
PCT Pub. Date: Mar. 1, 2018

(65) Prior Publication Data
US 2019/0201999 A1    Jul. 4, 2019

(30) Foreign Application Priority Data
Aug. 22, 2016 (JP) .............................. JP2016-161754

(51) Int. Cl.
*B32B 15/00* (2006.01)
*B23K 11/16* (2006.01)
(Continued)

(52) U.S. Cl.
CPC .......... *B23K 11/16* (2013.01); *B23K 11/0026* (2013.01); *B23K 11/115* (2013.01);
(Continued)

(58) Field of Classification Search
None
See application file for complete search history.

(56) References Cited

U.S. PATENT DOCUMENTS 6,709,535 B2 *   3/2004  Utsumi ................... C22C 38/02
                                             148/334
2013/0071687 A1    3/2013  Takagi
(Continued)

FOREIGN PATENT DOCUMENTS

CN           1769509 A       5/2006
CN         105408513 A       3/2016
(Continued)

OTHER PUBLICATIONS

European Communication Pursuant to Article 94(3) for European Application No. 17843525.1, dated Apr. 3, 2020, 6 pages.
(Continued)

*Primary Examiner* — Seth Dumbris
(74) *Attorney, Agent, or Firm* — RatnerPrestia

(57) ABSTRACT

Provided is an automotive member, or particularly, a steel sheet having a tensile strength exceeding 900 MPa. The automotive member has a resistance weld for fixing two or more steel sheets containing a predetermined composition, in which a maximum hardness ($HV_{BM}$) in a heat-affected zone of the resistance weld is at least 1.1 times hardness ($HV_W$) of a nugget in the resistance weld formed in a softest steel sheet of a sheet set during resistance welding, and furthermore, an average grain size of a steel sheet structure of the heat-affected zone within 2 mm in a direction at a right angle to a sheet thickness from an end part of the nugget of the high-strength steel sheet is 3 μm or less, and a minimum hardness ($HV_{min}$) in the heat-affected zone is at least 90% of hardness ($HV_\alpha$) of the high-strength steel sheet before the resistance welding.

16 Claims, 2 Drawing Sheets

(51) Int. Cl.
  *C21D 6/00* (2006.01)
  *C21D 8/02* (2006.01)
  *C21D 9/46* (2006.01)
  *C22C 38/00* (2006.01)
  *C22C 38/02* (2006.01)
  *C22C 38/06* (2006.01)
  *C22C 38/08* (2006.01)
  *C22C 38/16* (2006.01)
  *C22C 38/26* (2006.01)
  *C22C 38/28* (2006.01)
  *C22C 38/38* (2006.01)
  *C22C 38/14* (2006.01)
  *B23K 11/20* (2006.01)
  *C22C 38/04* (2006.01)
  *B23K 11/11* (2006.01)
  *C22C 38/12* (2006.01)
  *B32B 15/01* (2006.01)
  *B23K 11/00* (2006.01)
  *F16B 5/08* (2006.01)
  *B23K 103/04* (2006.01)
  *B23K 103/18* (2006.01)
  *B23K 101/18* (2006.01)
  *B23K 101/34* (2006.01)
  *B23K 101/00* (2006.01)

(52) U.S. Cl.
  CPC ............ *B23K 11/166* (2013.01); *B23K 11/20* (2013.01); *B32B 15/01* (2013.01); *B32B 15/013* (2013.01); *C21D 6/001* (2013.01); *C21D 6/002* (2013.01); *C21D 6/005* (2013.01); *C21D 6/008* (2013.01); *C21D 8/0205* (2013.01); *C21D 8/0226* (2013.01); *C21D 8/0236* (2013.01); *C21D 8/0263* (2013.01); *C21D 9/46* (2013.01); *C22C 38/001* (2013.01); *C22C 38/002* (2013.01); *C22C 38/005* (2013.01); *C22C 38/02* (2013.01); *C22C 38/04* (2013.01); *C22C 38/06* (2013.01); *C22C 38/08* (2013.01); *C22C 38/12* (2013.01); *C22C 38/14* (2013.01); *C22C 38/16* (2013.01); *C22C 38/26* (2013.01); *C22C 38/28* (2013.01); *C22C 38/38* (2013.01); *F16B 5/08* (2013.01); *B23K 2101/006* (2018.08); *B23K 2101/18* (2018.08); *B23K 2101/34* (2018.08); *B23K 2103/04* (2018.08); *B23K 2103/18* (2018.08); *C21D 2211/001* (2013.01); *Y10T 428/12965* (2015.01); *Y10T 428/12979* (2015.01)

(56) References Cited

U.S. PATENT DOCUMENTS

| 2014/0050941 | A1 | 2/2014 | Kawaski et al. |
| 2016/0167157 | A1* | 6/2016 | Perlade .................. B23K 11/11 403/270 |
| 2017/0204492 | A1 | 7/2017 | Ueda et al. |

FOREIGN PATENT DOCUMENTS

| CN | 105750760 A | 7/2016 |
| EP | 2138599 A1 | 12/2009 |
| EP | 2426230 A1 | 3/2012 |
| EP | 2784168 A1 | 10/2014 |
| EP | 3052672 B1 | 8/2016 |
| JP | 2000080440 A | 3/2000 |
| JP | 2001049343 A | 2/2001 |
| JP | 2007169679 A | 7/2007 |
| JP | 2015093282 A | 5/2015 |
| WO | 2004104256 A1 | 12/2004 |
| WO | 2011152017 A1 | 12/2011 |
| WO | 2012147898 A1 | 11/2012 |
| WO | 2015011547 A2 | 1/2015 |
| WO | 2016021169 A1 | 2/2016 |

OTHER PUBLICATIONS

Japanese Office Action for Japanese Application No. 2017-562098, dated Aug. 28, 2018, with Concise Statement of Relevance of Office Action, 5 pages.
Extended European Search Report for European Application No. 17 843 525.1, dated Apr. 25, 2019, 12 pages.
International Search Report and Written Opinion for International Application No. PCT/JP2017/029761, dated Nov. 14, 2017—6 pages 2019.
Korean Office Action for Korean Application No. 2019-7003643, dated Jul. 28, 2020, with Concise Statement of Relevance of Office Action, 7 pages.
Chinese Office Action with Search Report for Chinese Application No. 201780048282.4, dated Jun. 12, 2020, 9 pages.

* cited by examiner

AUTOMOTIVE MEMBER HAVING RESISTANCE WELD

CROSS REFERENCE TO RELATED APPLICATIONS

This is the U.S. National Phase application of PCT/JP2017/029761, filed Aug. 21, 2017, which claims priority to Japanese Patent Application No. 2016-161754, filed Aug. 22, 2016, the disclosures of these applications being incorporated herein by reference in their entireties for all purposes.

FIELD OF THE INVENTION

The present invention relates to a steel material having a high-strength weld, and more particularly, to an automotive member having an excellent resistance weld for a high-strength steel sheet suitable as a member of a structural component of an automobile, or the like.

BACKGROUND OF THE INVENTION

In recent years, stricter regulations are imposed on $CO_2$ emissions in view of increased environmental problems, and reducing weight of an automobile body to improve fuel economy is in progress in an automobile field in particular. To reduce a weight of vehicle body, it is effective to make automobile parts thinner by applying high-strength steel sheet, and application of high-strength steel sheet with tensile strength of 900 MPa or more is in progress.

In many cases, assembling an automobile employs a way of combining press-formed automobile parts by resistance welding (spot welding) in view of cost and manufacturing efficiency. Therefore, to accompany increased strength of the steel sheet, strength of a weld is required to be improved. However, in general, while tensile strength of joints of the welds (meaning tensile shearing strength measured by loading tensile load in a shearing direction, hereinafter referred to as tensile shearing strength) increases proportionally as the tensile strength of the welding steel sheet (base material) increases, there arises a problem that the cross tensile strength of the joints of the welds decreases when the tensile strength of the base material exceeds 900 MPa, thus resulting in a fracture form of an interface fracture.

As an example of related art for improving strength of a weld, Patent Literature 1 discloses a technique for ensuring the strength of the weld by providing a steel composition having an adjusted amount of C content or the like, and by changing welding conditions.

PATENT LITERATURE

PTL 1: Japanese Unexamined Patent Application Publication No. 2015-93282

SUMMARY OF THE INVENTION

However, in Patent Literature 1, since the amount of C content or the like is specified to keep a carbon equivalent within a predetermined range, the material of the base material is limited and it becomes difficult to ensure high ductility required for steel sheets for automobiles. Furthermore, low-P or low-S processing causes the steelmaking cost to increase. Further, according to the welding condition of Patent Literature 1, when the welding time is prolonged, the assembly process of the automobile is also prolonged, resulting in drastically decreased productivity. Accordingly, there is indeed no technique developed for high-strength steel sheets with tensile strength exceeding 700 MPa, with the fracture form that is not interface fracture in the cross tensile test after welding.

In view of the above problems, it is an object according to aspects of the present invention to provide an automotive member having a resistance weld for which the fracture form in a cross tensile test is a plug fracture, the automotive member being a high-strength steel sheet, particularly a steel sheet having a tensile strength exceeding 900 MPa.

In the related arts, in a steel sheet with a tensile strength exceeding 900 MPa, localized stress concentration occurs due to presence of a softened part of a heat-affected zone (hereinafter, referred to as HAZ softened part) generated after welding, which is an origin of crack. Furthermore, the presence of coarse martensite in a hardened part of the heat-affected zone (hereinafter referred to as HAZ hardened part) makes it easier for the crack to propagate and the interface fracture to occur.

As a result of intensive studies to achieve the object mentioned above, the present inventors have found that it is possible to decrease the amount of softening of the HAZ softened part under concentrated stress, by adjusting the composition of the steel sheet to an optimum level. That is, it is possible to ensure strength even for high-strength materials without softening the heat-affected zone, and also by producing a fine HAZ hardened part.

Furthermore, when three or more steel sheets including a steel sheet having the optimally adjusted composition described above are overlapped and welded, since hardness of the HAZ hardened part is higher than hardness of a nugget in a softest steel sheet of a sheet set, the strength of the HAZ hardened part can be ensured. As a result, it was found that sufficient strength can be ensured in the cross tensile test, in which the plug fracture occurred.

Specifically, by adding 3.1% or more of Mn, the martensitic transformation start temperature is lowered to prevent tempering of martensite during welding. Furthermore, by producing carbonitride of Ti or Nb, the steel sheet structure after welding is refined to increase the hardness of the HAZ hardened part. As a result, it was confirmed that stress concentration in the HAZ softened part is reduced, so that it is possible to prevent interface fracture and to provide an automotive member having a healthy resistance weld, that is, an excellent resistance weld.

Aspects of the present invention are based on the findings described above and the gist of such aspects of the invention is as follows.

[1] An automotive member having a resistance weld for fixing two or more steel sheets including at least one high-strength steel sheet, the high-strength steel sheet including a composition containing, in mass %, C: 0.08 to 0.25%, Si: 0.01 to 2.50%, Mn: 3.1 to 8.1%, Al: 0.01 to 2.00%, N: 0.010% or less, and each of one or two of Ti and Nb: 0.005 to 0.100%, the balance being Fe and unavoidable impurities, in which a maximum hardness ($HV_{BM}$) in a heat-affected zone of the resistance weld is at least 1.1 times hardness ($HV_W$) of a nugget in the resistance weld formed in a softest steel sheet of a sheet set during resistance welding, an average grain size of a steel sheet structure of the heat-affected zone within 2 mm in a direction at a right angle to a sheet thickness from an end part of the nugget of the high-strength steel sheet is 3 μm or less, and a minimum hardness ($HV_{min}$) in the heat-affected zone is at least 90% of hardness ($HV_\alpha$) of the high-strength steel sheet before the resistance welding.

[2] The automotive member having a resistance weld according to [1], in which the composition further contains, in mass %, one or more selected from the group of V: 0.05% or less, B: 0.010% or less, Cu: 0.50% or less, Ni: 0.50% or less, Cr: 0.50% or less, Mo: 0.50% or less, Ca: 0.0050% or less, and REM: 0.0050% or less.

[3] The automotive member having a resistance weld according to [1] or [2], in which the high-strength steel sheet has a structure containing, in terms of an area ratio, 20 to 50% of retained austenite.

[4] The automotive member having a resistance weld according to any one of [1] to [3], in which the high-strength steel sheet includes a coating layer formed on a surface thereof.

[5] The automotive member having a resistance weld according to [4], in which the coating layer is a galvanized layer.

[6] The automotive member having a resistance weld according to [4], in which the coating layer is a galvannealed layer.

According to aspects of the present invention, the high-strength steel sheet is a steel sheet having a tensile strength exceeding 900 MPa, and includes a cold rolled steel sheet, and a steel sheet obtained by subjecting a cold rolled steel sheet to a surface treatment such as galvanizing treatment or galvannealing treatment. Also, according to aspects of the present invention, an excellent resistance weld means a resistance weld in which a fracture form in a cross tensile test after resistance welding is a plug fracture.

According to aspects of the present invention, an automotive member having a resistance weld for which the fracture form in a cross tensile test after resistance welding is a plug fracture is provided, in which the automotive member is a steel sheet having a tensile strength exceeding 900 MPa.

DETAILED DESCRIPTION OF EMBODIMENTS OF THE INVENTION

Figure 1:
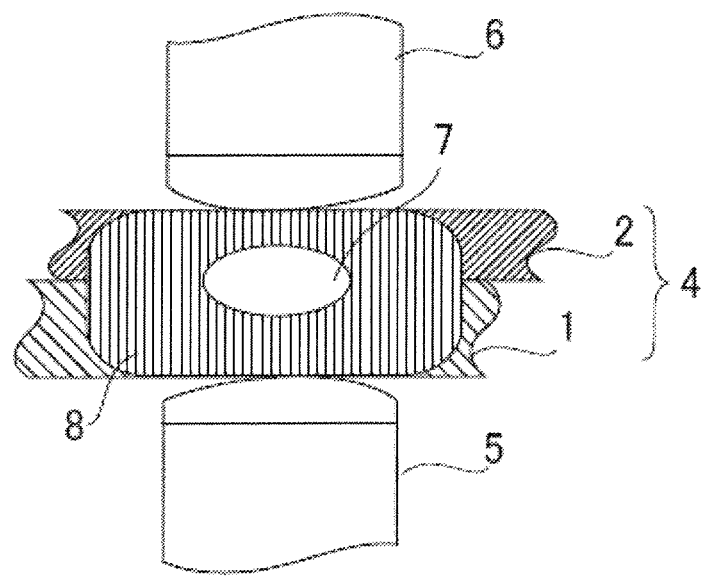
FIG. 1 is a cross-sectional view illustrating an example of a spot welding method according to an embodiment of the present invention.

Hereinafter, aspects of the present invention will be described in detail. Further, the present invention is not limited to the embodiments described below.

First, the composition of the high-strength steel sheet according to aspects of the present invention and reasons for its limitation, will be explained. Further, "%" denoting the following composition refers to "mass %", unless otherwise specified.

C: 0.08 to 0.25%

C is an element effective for increasing the strength of the steel sheet. To obtain a base material having tensile strength exceeding 900 MPa, it is necessary that C content is 0.08% or more. Preferably, the C content is 0.095% or more. More preferably, the C content is 0.11% or more. Furthermore, when the C content is less than 0.08%, the martensitic transformation start temperature is raised to promote tempering of martensite during welding. Therefore, the amount of softening of the HAZ softened part increases. On the other hand, with an excess C content, the toughness of the nugget is degraded and interface fracture occurs. Therefore, the C content is 0.25% or less. Preferably, the C content is 0.21% or less. More preferably, the C content is 0.18% or less.

Si: 0.01 to 2.50%

Si serves as solid solution strengthening of ferrite. Furthermore, Si also contributes to solid solution strengthening of the HAZ softened part. To obtain these effects, it is necessary that Si content is 0.01% or more. Preferably, the Si content is 0.10% or more. On the other hand, with an excess Si content, the surface characteristics (chemical conversion treatability and coating property) of the steel sheet deteriorates. Therefore, the Si content is 2.50% or less. Preferably, the Si content is 2.00% or less. More preferably, the Si content is 1.50% or less.

Mn: 3.1 to 8.1%

Mn is an important element in accordance with aspects of the present invention. Mn lowers the martensite transformation start temperature and prevents tempering of martensite during welding. As a result, the amount of softening of the HAZ softened part is significantly decreased. Furthermore, Mn also greatly affects the formation of retained austenite in the steel sheet structure of the base material. To obtain these effects, it is necessary that the Mn content is 3.1% or more. Preferably, the Mn content is 3.5% or more. More preferably, the Mn content is 4.0% or more. Still more preferably, the Mn content is 4.5% or more. On the other hand, excessive Mn content results in degraded coating property. Therefore, the Mn content is 8.1% or less. Preferably, the Mn content is 7.5% or less. More preferably, the Mn content is 7.0% or less. Still more preferably, the Mn content is 6.3% or less.

Al: 0.01 to 2.00%

Al is an element necessary for deoxidation. To obtain this effect, it is necessary that Al content is 0.01% or more. Preferably, the Al content is 0.02% or more. On the other hand, excessive Al content results in degraded coating property. Therefore, the Al content is 2.00% or less. Preferably, the Al content is 1.50% or less.

N: 0.010% or less

N forms coarse nitrides. It is necessary to reduce N content as the tensile strength of HAZ decreases because of voids formed due to its inclusion. When the N content exceeds 0.010%, the tendency becomes noticeable. Therefore, the N content is 0.010% or less. Preferably, the N content is 0.005% or less. Since an extremely low N leads to an increased steelmaking cost, the N content is preferably 0.0003% or more.

Each of one or two of Ti and Nb: 0.005 to 0.100%

Ti: 0.005 to 0.100%

Ti contributes to an increase in hardness of the HAZ softened part by generating fine carbonitrides. Further, Ti prevents the growth of austenite during welding by generating carbonitrides. As a result, it is possible to reduce the amount of softening of the HAZ softened part by generating fine martensite after welding. To obtain such effect, it is necessary that Ti content is 0.005% or more. Preferably, the Ti content is 0.008% or more. More preferably, the Ti content is 0.010% or more. On the other hand, when Ti is contained in a large amount, the coating property is considerably degraded. Therefore, the Ti content is 0.100% or less. Preferably, the Ti content is 0.080% or less. More preferably, the Ti content is 0.060% or less.

Nb: 0.005 to 0.100%

Like Ti, Nb contributes to the reduction of the amount of softening of the HAZ softened part by generating fine carbonitrides. Therefore, Nb content is 0.005% or more. Preferably, the Nb content is 0.008% or more. More preferably, the Nb content is 0.010% or more. On the other hand, similarly to Ti, excessive Nb content degrades the coating property. Therefore, the Nb content is 0.100% or less. Preferably, the Nb content is 0.080% or less. More preferably, the Nb content is 0.060% or less.

The balance is Fe and unavoidable impurities. Examples of the inevitable impurities include P, S, Sb, Sn, Zn, Co and the like, and the allowable range of these contents is P: 0.05% or less, S: 0.005% or less, Sb: 0.01% or less, Sn: 0.10% or less, Zn: 0.01% or less, and Co: 0.10% or less. Furthermore, according to aspects of the present invention, even with the Ta, Mg and Zr contents in total of less than 0.1%, the effect is not lost.

With the essential elements described above, the steel sheet according to aspects of the present invention can attain the aimed characteristics, but in addition to the above essential elements, the following elements may be contained as necessary.

One or more of V: 0.05% or less, B: 0.010% or less, Cu: 0.50% or less, Ni: 0.50% or less, Cr: 0.50% or less, Mo: 0.50% or less, Ca: 0.0050% or less, and REM: 0.0050% or less V: 0.05% or less V is an element that contributes to increased strength of HAZ by forming fine carbonitrides, and may be contained as necessary. To obtain such an effect, V content, if contained, is preferably 0.01% or more. On the other hand, an excess V exceeding 0.05% provides little effect of increasing the strength. Furthermore, it results in an increase in alloy cost. Therefore, the V content, when contained, is preferably 0.05% or less.

B: 0.010% or less

B is an element that contributes to an increase in strength of HAZ by improving hardenability and may be contained as necessary. To exhibit these effects, B content, when contained, is preferably 0.0003% or more. On the other hand, a B content exceeding 0.010% leads to a saturated effect. Therefore, the B content, when contained, is preferably 0.010% or less.

Cu: 0.50% or less

Cu is an element that contributes to an increase in strength of steel sheet by solid solution strengthening and may be contained as necessary. To exhibit these effects, the Cu content, when contained, is preferably 0.05% or more. On the other hand, a Cu content exceeding 0.50% leads to a saturated effect. Furthermore, surface defects due to Cu are likely to occur. Therefore, the Cu content, when contained, is preferably 0.50% or less.

Ni: 0.50% or less

Like Cu, Ni is an element that contributes to an increase in strength of steel sheet by solid solution strengthening and may be contained as necessary. To exhibit these effects, Ni content, when contained, is preferably 0.05% or more. Furthermore, when contained together with Cu, Ni provides an effect of preventing surface defects caused by Cu. Accordingly, it is effective to add Ni when Cu is contained. On the other hand, a Ni content exceeding 0.50% leads to a saturated effect. Therefore, the Ni content, when contained, is preferably 0.50% or less.

Cr: 0.50% or less

Cr is an element that contributes to an increase in strength of HAZ by improving hardenability and may be contained as necessary. To exhibit these effects, Cr content, when contained, is preferably 0.05% or more. On the other hand, the Cr content exceeding 0.50% results in excessive generation of martensite. Therefore, the Cr content is preferably 0.50% or less.

Mo: 0.50% or less

Like Cr, Mo is an element that contributes to an increase in strength of HAZ by improving hardenability and may be contained as necessary. To exhibit these effects, Mo content, when contained, is preferably 0.01% or more. On the other hand, a Mo content exceeding 0.50% leads to a saturated effect. Therefore, the Mo content, when contained, is preferably 0.50% or less.

Ca: 0.0050% or less

Ca is an element that causes spheroidization of the shape of sulfide and contributes to improvement of adverse influence due to segregation of weld and may be contained as necessary. To exhibit these effects, Ca content, when contained, is preferably 0.0005% or more. On the other hand, with the Ca content exceeding 0.0050%, sulfide deteriorates the bendability. Therefore, the Ca content, when contained, is preferably 0.0050% or less.

REM: 0.0050% or less

Like Ca, REM is an element that causes spheroidization of the shape of sulfide and contributes to improvement of adverse influence due to segregation of weld and may be contained as necessary. To exhibit these effects, REM content, when contained, is preferably 0.0005% or more. On the other hand, a REM content exceeding 0.0050% leads to a saturated effect. Therefore, the REM content, when contained, is preferably 0.0050% or less.

Aspects of the present invention use a high-strength steel sheet having the composition described above as a base material. Furthermore, the steel sheet structure of the base material is not particularly limited. However, the steel sheet structure of the high-strength steel sheet in accordance with aspects of the present invention preferably contains, in terms of an area ratio, 20 to 50% of retained austenite. The reason will be described below. When using a steel sheet with tensile strength exceeding 900 MPa, press forthability becomes a problem. Therefore, it is preferable to contain retained austenite that can ensure high uniform elongation by the stress and strain induced transformation. To obtain this effect, the area ratio of retained austenite is preferably 20% or more. More preferably, the area ratio of retained austenite is 25% or more. On the other hand, the presence of excessive amount of retained austenite exceeding the area ratio of 50% sometimes results in formation of local hardened parts, which may make it difficult to ensure high elongation. Therefore, the area ratio of retained austenite is preferably 50% or less. More preferably, the area ratio of retained austenite is 45% or less. Furthermore, the area ratio refers to the area ratio regarding the entire steel sheet structure. Furthermore, the area ratio of retained austenite may be measured by the method according to Examples that will be described below.

According to aspects of the present invention, the structure other than retained austenite may be martensite, bainite or the like.

The area ratio of these structures is preferably 10% or less in total.

Furthermore, according to aspects of the present invention, the high-strength steel sheet may be produced by a generally known method. For example, a steel slab having the composition described above is produced by a converter—ladle refining—continuous casting method. This steel slab is subjected to hot rolling under conditions of a heating temperature of 1100 to 1250° C. and a finish rolling stop temperature of 700 to 1000° C., and to coiling at a coiling temperature of 200 to 700° C., thus formed into a hot rolled steel sheet. Next, the hot rolled steel sheet obtained is subjected to pickling and then to heat treatment at 550 to 800° C. Thereafter, after subjecting to cold rolling, a cold rolled steel sheet may be obtained by performing a heat treatment at 600 to 850° C. for 10 minutes and then annealing to cool to room temperature.

According to aspects of the present invention, if necessary, a coating layer may be provided on the surface of the steel sheet of the base material including the high-strength steel sheet having the composition described above. Furthermore, the coating treatment is carried out by a generally used method, for example, galvanizing treatment and electrogalvanizing treatment. For example, in particular for automobile applications, a galvanizing treatment may be applied to the surface of a steel sheet to obtain a galvanized steel sheet (hereinafter, also referred to as a GI steel sheet). Further, after galvanizing, alloyed treatment may be performed to obtain a galvannealing steel sheet (hereinafter, also referred to as GA steel sheet).

Next, a resistance weld of an automotive member according to aspects of the present invention and the welding conditions for the resistance welding will be described.

Figure 2:
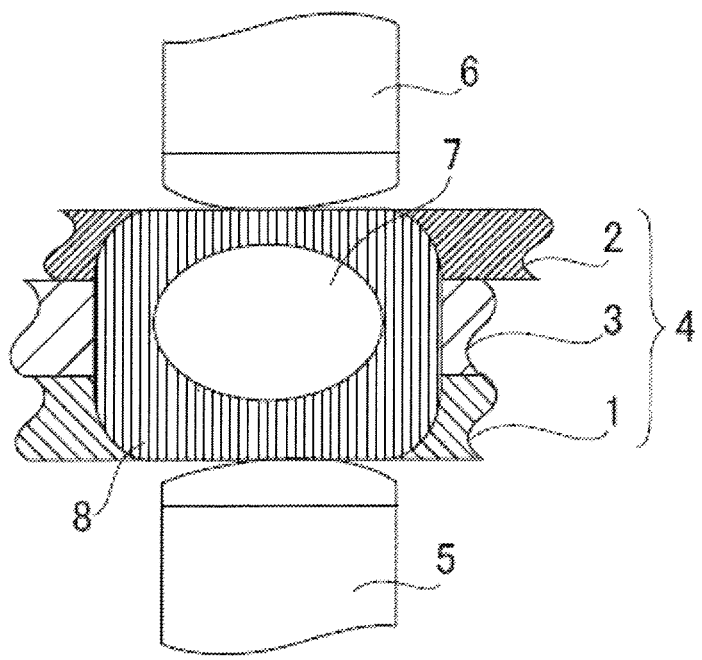
FIG. 2 is a cross-sectional view illustrating another example of a spot welding method according to an embodiment of the present invention.

As shown in FIGS. 1 and 2, an automotive member having a resistance weld according to aspects of the present invention is a member including a resistance weld having formed a nugget 7 of a desired size by sandwiching, between a pair of upper and lower electrode tips (a lower electrode tip 5 and an upper electrode tip 6), a sheet set 4 made of overlapping two or more steel sheets including at least one high-strength steel sheet having the composition described above, and melting contact portion by applying current and pressure to the sheet set 4. Here, a sheet set including two or three overlapped steel sheets is used. Furthermore, by two or more steel sheets including at least one high-strength steel sheet having the composition described above, it means that at least one of two or more steel sheets is a high-strength steel sheet having the composition described above. Therefore, in a sheet set that includes two overlapped steel sheets, a bottom steel sheet 1 and a top steel sheet 2 may be the high-strength steel sheets having the composition described above. Furthermore, in a sheet set that includes three overlapped steel sheets, for example, only the bottom steel sheet 1, or for example, the bottom steel sheet 1 and the steel sheet 3 located between the top and bottom steel sheets may be the high-strength steel sheet having the composition described above.

Next, the welding conditions for resistance welding will be described.

Figure 3:
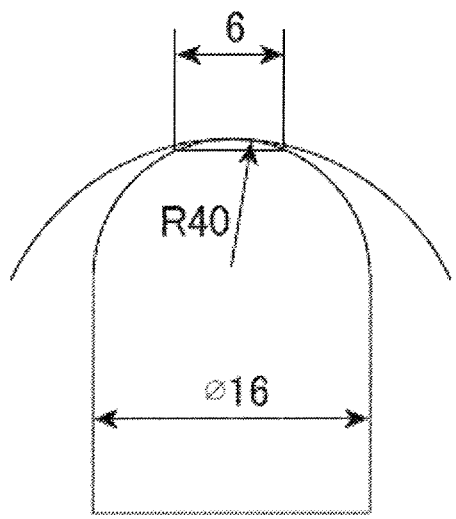
FIG. 3 is a view explaining an example of an electrode tip used in accordance with aspects of the present invention.

According to aspects of the present invention, a resistance spot welding method, which is one type of overlap resistance welding method, is used. A suitably available resistance welding machine according to aspects of the present invention may be a machine that is equipped with a pair of upper and lower electrodes and capable of applying current and pressure to a portion to be welded sandwiched therebetween. Furthermore, the resistance welding machine may include a welding pressure control device and a welding current control device capable of arbitrarily controlling welding pressure and welding current during welding, respectively. Furthermore, in the resistance welding machine, a pressurizing mechanism such as an air cylinder and a servomotor, AC or DC control mechanism, a stationary type, a robot gun and the like are not particularly limited. In this example, the resistance spot welding is performed using a DC-powered resistance welding machine with a servomotor pressurizing type attached to a welding gun. As shown in FIG. 3, for the pair of electrode tips, DR type electrodes of alumina dispersed copper having a curvature radius of R40 of a tip and a tip diameter of 6 mm may be prepared.

For the welding conditions according to aspects of the present invention, the welding force is set to 2.0 to 7.0 kN to obtain a healthy nugget. Preferably, the welding force is 2.5 to 6.0 kN. Furthermore, to obtain a nugget diameter that can ensure the strength, the welding time is 5 to 50 cycles (50 Hz). Preferably, the welding time is 10 to 30 cycles (50 Hz). The holding time is 0.5 to 100 cycles (50 Hz). Preferably, the holding time is 1 to 20 cycles (50 Hz). Furthermore, the welding current is adjusted in the range of 4.0 to 10.0 kA so that the nugget diameter becomes $5\sqrt{t}$ or more (t is sheet thickness) to avoid the expansion of the heat affected region and the subsequent decrease in strength.

For example, the resistance spot welding is performed under conditions of a welding force of 3.0 to 5.0 kN, a welding time of 15 to 25 cycles (50 Hz), and a holding time of 1 to 15 cycles (50 Hz), and the welding current is adjusted within the range of 5.0 to 7.0 kA for the nugget diameter to become $5\sqrt{t}$ or more (t is sheet thickness).

The resistance weld of the automotive member according to aspects of the present invention obtained by the resistance spot welding described above will be described. As shown in FIGS. 1 and 2, in the member including the resistance weld after the resistance welding, the heat-affected zone (HAZ) 8 refers to the zone around the periphery of the nugget 7 where hardness is changed after the change of structure due to heating.

According to aspects of the present invention, the maximum hardness (hereinafter, also referred to as $HV_{BM}$) in the heat-affected zone 8 of the resistance weld is at least 1.1 times the hardness (hereinafter, also referred to as $HV_W$) of a nugget formed in a softest steel sheet in a sheet set during resistance welding. When $HV_{BM}$ is less than 1.1 times the $HV_W$, there occurs stress concentration on the end part of the nugget 7 in the softest steel sheet in the sheet set during resistance welding such that cracks propagate from the heat-affected zone (HAZ) 8 to cause the interface fracture. Preferably, the $HV_{BM}$ is 1.2 times the $HV_W$ or more. More preferably, the $HV_{BM}$ is 1.3 times the $HV_W$ or more. On the other hand, when the hardness of the heat-affected zone (HAZ) 8 is too high, the toughness deteriorates and the cracks are generated from the heat-affected zone (HAZ) 8, resulting in the interface fracture. Therefore, the $HV_{BM}$ is preferably 2.0 times the $HV_W$ or less. More preferably, the $HV_{BM}$ is 1.8 times the $HV_W$ or less. Furthermore, each hardness ($HV_{BM}$, $HV_W$) can be measured by the method described in the Examples described below.

According to aspects of the present invention, in the high-strength steel sheet having the composition described above, the average grain size (hereinafter, also referred to as grain size) of the steel sheet structure of the heat-affected zone (HAZ) 8 within 2 mm in a direction at a right angle to the sheet thickness from the end part e of the nugget 7 is 3 µm or less. Furthermore, in the high-strength steel sheet having the composition described above, the end part e of the nugget 7 refers to both end parts in the nugget diameter direction of the nugget formed in the high-strength steel sheet having the composition described above in the sheet set during resistance welding. When the grain size exceeds 3 µm, the martensite transformation start temperature is high, which means that tempering of martensite is promoted during resistance welding.

Therefore, the amount of softening of the HAZ softened part increases. Furthermore, the coarsening of grains causes degraded toughness and facilitated cracking, resulting in the interface fracture. Preferably, the grain size is 2 µm or less. On the other hand, considering that the toughness is rather degraded with the excessive increase in strength by refinement, the grain size is preferably 0.1 µm or more. More preferably, the grain size is 0.2 µm or more. Furthermore, the grain size can be measured by the method described in the Examples described below.

According to aspects of the present invention, in the resistance weld of the high-strength steel sheet having the composition described above, the minimum hardness ($HV_{min}$) in the heat-affected zone is at least 90% of the hardness of high-strength steel sheet having the composition described above before the resistance welding. Here, the ratio of the minimum hardness ($HV_{min}$) of the heat-affected zone to the hardness (hereinafter, also referred to as $HV_\alpha$) of the high-strength steel sheet having the composition described above before the resistance welding is defined as Hv ratio. When the Hv ratio is less than 90%, it means a significant amount of softening of the HAZ softened part exists in the high-strength steel sheet having the composition described above, where HAZ cracks are generated. Preferably, the Hv ratio is 93% or more. More preferably, the Hv ratio is 96% or more. Furthermore, the hardness ($HV_{min}$) can be measured by the method described in the Examples described below.

Figure 4:
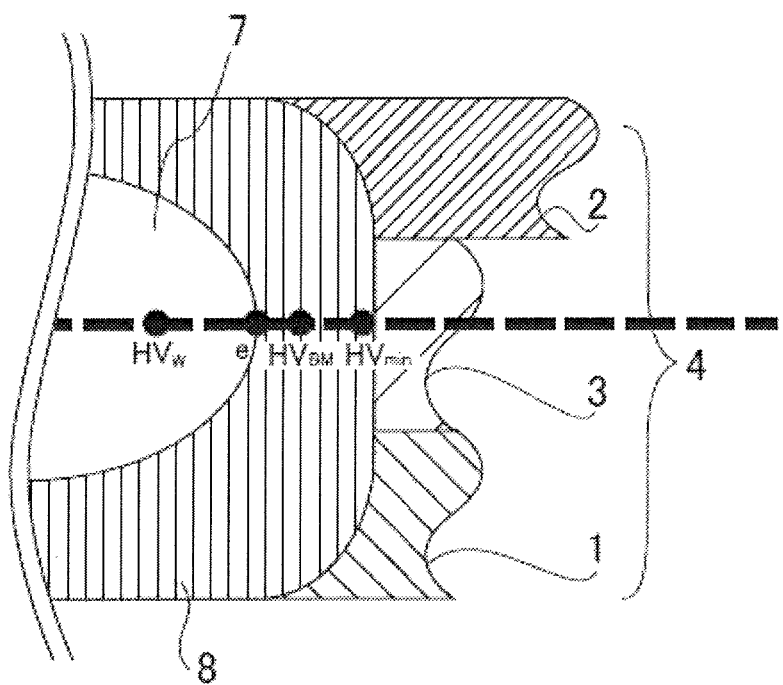
FIG. 4 is a partially enlarged longitudinal cross-sectional view explaining a schematic configuration of a welded joint obtained by the spot welding method according to aspects of the present invention.

Here, $HV_{BM}$, $HV_{min}$, and $HV_W$ will be described with reference to FIG. 4. FIG. 4 is a partially enlarged vertical cross-sectional view for explaining a schematic configuration of a member (welded joint) having a resistance weld after the resistance welding, as illustrated in FIGS. 1 and 2. In FIG. 4, the symbol e denotes both end parts in the nugget diameter direction of the nugget 7 formed in the high-strength steel sheet (for example, the steel sheet 3) having the composition described above in the sheet set during resistance welding. $HV_{BM}$ indicates the maximum hardness in a predetermined region extending outward from an outer periphery of the nugget 7 and in the region of the heat-affected zone (HAZ) 8. $HV_{min}$ indicates the minimum hardness in a predetermined region extending outward from the outer periphery of the nugget 7 and in the region of the heat-affected zone 8. When the end part e of the nugget 7 is set as a starting point, a region within 2 mm outward from the both end parts e of the nugget 7 in the direction at a right angle to the sheet thickness is set as the measurement range. $HV_W$ indicates the minimum hardness in a predetermined region extending inward from the outer periphery of the nugget 7 and in the region of the nugget 7. Here, a region within 2 mm inward from the both end parts e of the nugget 7 in the direction at a right angle to the sheet thickness is set as the measurement range.

According to aspects of the present invention, $HV_\alpha$ is obtained by Equation (1).

$$HV_\alpha(Hv) = (\text{tensile strength of the high-strength steel sheet having the composition described above before the resistance welding (MPa)} - 30)/3.14 \quad (1)$$

Furthermore, when different hardness coexists in the sheet set, the hardness is calculated using a steel sheet having the highest Mn content.

Further, as described above, the Hv ratio can be obtained by Equation (2).

$$Hv\ \text{ratio}(\%) = HV_{min}/HV_\alpha \times 100 \quad (2)$$

EXAMPLES

Hereinafter, examples according to aspects of the present invention will be described. Furthermore, the present invention is not limited to the examples described below.

Steel slabs having the composition shown in Table 1 were produced by a conventionally known method, for example, a converter—ladle refining—continuous casting method. The steel slabs were then subjected to hot rolling under the conditions of a heating temperature of 1250° C. and finish rolling stop temperature of 900° C., and to coiling at a coiling temperature of 500° C., thus formed into a hot rolled steel sheet having a thickness of 2.6 mm. Next, the resulting hot rolled steel sheet was subjected to pickling and then to heat treatment at 700° C. Then, after subjecting to cold rolling, a cold rolled steel sheet having a thickness of 1.2 mm was obtained by performing a heat treatment at 650° C. for 10 minutes and annealing to cool to room temperature.

TABLE 1

| | Composition (mass %) | | | | | | | | |
|---|---|---|---|---|---|---|---|---|---|
| Steel type | C | Si | Mn | Al | N | Ti | Nb | Other component | Remarks |
| A | 0.15 | 0.24 | 5.02 | 0.03 | 0.002 | 0.035 | — | — | Inventive steel |
| B | 0.13 | 0.51 | 4.88 | 0.02 | 0.003 | — | 0.021 | — | Inventive steel |
| C | 0.18 | 0.33 | 3.89 | 0.03 | 0.002 | 0.025 | — | V: 0.04 | Inventive steel |
| D | 0.16 | 0.66 | 5.32 | 0.02 | 0.003 | 0.033 | 0.015 | Ni: 0.05 | Inventive steel |
| E | 0.13 | 0.25 | 5.89 | 0.03 | 0.002 | 0.031 | — | Cu: 0.08 | Inventive steel |
| F | 0.14 | 0.18 | 6.31 | 0.03 | 0.002 | 0.015 | — | Mo: 0.12 | Inventive steel |
| G | 0.11 | 0.41 | 5.31 | 0.03 | 0.002 | 0.022 | 0.019 | Cr: 0.15 | Inventive steel |
| H | 0.12 | 0.22 | 4.56 | 0.02 | 0.003 | 0.029 | — | Ca: 0.0015 | Inventive steel |
| I | 0.14 | 0.31 | 5.11 | 0.03 | 0.002 | 0.033 | — | REM: 0.0012 | Inventive steel |
| J | 0.13 | 1.12 | 5.02 | 0.03 | 0.002 | 0.032 | — | B: 0.0015 | Inventive steel |
| K | <u>0.03</u> | 0.22 | 4.99 | 0.03 | 0.002 | 0.033 | — | — | Comparative steel |
| L | 0.18 | 0.34 | <u>2.11</u> | 0.03 | 0.003 | 0.035 | — | — | Comparative steel |
| M | 0.14 | 0.24 | 3.59 | 0.03 | 0.002 | — | — | — | Comparative steel |
| S | 0.16 | 0.55 | 3.89 | 0.03 | 0.002 | 0.015 | 0.012 | — | Inventive steel |

*Values outside the range of the present invention are underlined.

For the cold rolled steel sheet obtained as described above, quantitative evaluation of the constituent structure of the steel sheet and tensile test were carried out as shown below. The obtained results are listed in Table 3.

Area ratio of Retained Austenite

The area ratio of retained austenite was determined by X ray diffraction method using Co Kα beam. Using a test piece with the surface near the ¼ sheet thickness of the steel sheet as the measurement surface, the volume fraction of retained austenite was calculated based on a peak intensity ratio of the (211) plane and (220) plane of austenite and the (200) plane and (220) plane of ferrite, and regarded as the area ratio of retained austenite considering the three-dimensional homogeneity. The results are listed as the area ratio (%) of retained γ in Table 3.

Mechanical Properties

For the mechanical property (tensile strength TS), a JIS No. 5 tensile test piece having a longitudinal direction (tensile direction) at a right angle to the rolling direction was taken and evaluated by performing a tensile test according to JIS Z 2241 (2011), and tensile strength was measured.

Furthermore, in an embodiment according to aspects of the present invention, as illustrated in FIGS. 1 and 2, a sheet set 4, which is made by overlapping two or three steel sheets including at least one high-strength steel sheet having the composition described above, was subjected to the resistance spot welding using a DC-powered resistance welding machine with a servomotor pressurizing type attached to a welding gun to prepare a tensile test piece having a resistance welded portion. The pair of electrode tips used were DR type electrodes of alumina dispersed copper having a curvature radius R40 of the tip and a tip diameter of 6 mm, as illustrated in FIG. 3. Furthermore, the steel sheet other than the high-strength steel sheet according to aspects of the present invention constituting the sheet set 4 includes an arbitrary composition. For example, cold rolled steel sheets (steel types N to R) having the composition listed in Table 2 were used. Furthermore, the tensile strength of the steel sheets in Table 2 was measured in the same manner as described above. The 270 MPa class listed in Table 2 is a steel sheet having a tensile strength of 270 to 400 MPa, the 590 MPa class is a steel sheet having a tensile strength of 590 to 780 MPa, the 980 MPa class is a steel sheet having a tensile strength of 980 to 1180 MPa, the 1180 MPa class is a steel sheet having a tensile strength of 1180 to 1320 MPa, and the 1470 MPa class is a steel sheet having a tensile strength of 1470 to 1800 MPa.

Test pieces were cut out from cold rolled steel sheets obtained as described above and cold rolled steel sheets (steel types N to R) having the compositions in Table 2 and used as test pieces.

The resistance welding was performed under conditions of the welding force of 3500 N, the welding time of 14 to 16 cycles (50 Hz), and the holding time of 1 to 5 cycles (50 Hz), and the welding current was adjusted within the range of 5.0 to 9.0 kA to be 7.0 kA for the nugget diameter to become $5\sqrt{t}$ or more (t is sheet thickness). The welding conditions are listed in Table 3. The resulting resistance weld was evaluated by the following method, and the results are listed in Table 3.

Tensile Properties After Welding

Based on the cross tensile test method (JIS Z 3137 (1999)), tensile properties after welding were measured under welding conditions described above with 50×150 mm cross tensile test pieces (referred to herein as steel sheet α and steel sheet β) cut out. When there are three or more steel sheets, steel sheet γ was cut out into 50×50 mm steel sheets and welded to prepare a tensile test piece. The sheet set of the test pieces are listed in Table 3 (see the weld sheet set in Table 3). Furthermore, the presence or absence of coating on the test piece is shown in Table 3 (see the coating in Table 3). When there is no coating, it is cold rolled steel sheet, and GA is GA steel sheet, and GI is GI steel sheet. Furthermore, the coating weight of GA steel sheet and GI steel sheet was 45 g/m². The fracture form after cross tensile test was observed. In the fracture form of Table 3, it was regarded as plug fracture when the steel sheet remained on one side after the cross tensile test. Regarding the plug fracture, a case where the residual amount of the steel sheet was 70% or more was marked with symbol ○ (excellent), a case where the residual amount of the steel sheet was less than 70% was marked with symbol Δ (good), respectively. On the other hand, a case where the interface fracture occurred without residual steel sheet was marked with symbol x (poor).

Average Grain Size of HAZ

To measure the average grain size of HAZ, the sheet thickness cross section of the steel sheet parallel to the rolling direction was polished, etched with 3% nital, and then the structure of the steel sheet was observed for the heat-affected zone within 2 mm in the direction at a right angle to the sheet thickness from the end part of the nugget, using scanning type electron microscope (SEM), transmission type electron microscope (TEM), and field emission type scanning electron microscope (FE-SEM), and equivalent circle diameters were calculated from the steel sheet structure images taken with Image-Pro from Media Cybernetics, Inc. and the average grain size df HAZ was obtained by averaging those values.

Hardness of Resistance Weld

The hardness of the resistance weld was measured as specified in JIS Z 2244 (2009). The test force was 2.94 N (0.3 kgf). For the hardness measurement, the weld was cut in half, and the cross section was measured at a pitch of 100 μm after mirror polishing from the center of the nugget to 6 mm in the direction at a right angle to the sheet thickness, and the maximum $HV_{BM}$, $HV_{min}$ in of the heat affected zone of the steel sheet and the hardness $HV_W$ of the nugget of the softest steel sheet in the sheet set were determined. Furthermore, the cross section was measured at a pitch of 100 μm as described above, and the portion where the hardness

TABLE 2

| Steel type. | Composition (mass %) | | | | | | | | Remarks |
| | C | Si | Mn | Al | N | Ti | Nb | Other component | (Tensile strength) |
| --- | --- | --- | --- | --- | --- | --- | --- | --- | --- |
| N | 0.12 | 0.50 | 2.40 | 0.03 | 0.002 | — | — | — | 980 MPa class |
| O | 0.02 | 0.02 | 0.20 | 0.02 | 0.004 | — | — | — | 270 MPa class |
| P | 0.14 | 0.60 | 2.30 | 0.02 | 0.003 | — | — | — | 1180 MPa class |
| Q | 0.09 | 0.50 | 1.90 | 0.02 | 0.003 | — | — | — | 590 MPa class |
| R | 0.20 | 0.50 | 2.50 | 0.02 | 0.003 | — | — | — | 1470 MPa class | remained unchanged with the heat-affected zone and the hardness was stable, and where the steel sheet structure remained unchanged after nital etching was the hardness $HV_{min}$ of the steel sheet α after the resistance welding.

lar, when the amount of Mn exceeds 4.0% (Test piece Nos. 1 to 5, 7 to 13), the residual amount of the steel sheet was 70% or more, which was found to be superior in the evaluation of plug fracture.

TABLE 3

| | Weld sheet set | | | | | | | | Welding condition | | | |
|---|---|---|---|---|---|---|---|---|---|---|---|---|
| | Steel sheet α | | Steel sheet β | | Steel sheet γ | | Coating | | | | | | |
| Test piece No. | Steel type | Tensile strength (MPa) | Steel type | Tensile strength (MPa) | Steel type | Tensile strength (MPa) | Steel sheet α | Steel sheet β | Steel sheet γ | Welding force (N) | Welding current (kA) | Welding time (cycle) | Holding time (cycle) |
| 1 | A | 1181 | A | 1181 | — | — | None | None | — | 3500 N | 7 | 14 | 1 |
| 2 | A | 1181 | N | 980 | — | — | GA | GA | — | 3500 N | 7 | 14 | 1 |
| 3 | A | 1181 | O | 270 | — | — | None | GA | — | 3500 N | 7 | 14 | 1 |
| 4 | A | 1181 | P | 1180 | O | 270 | GA | None | GA | 3500 N | 7 | 14 | 1 |
| 5 | B | 1288 | P | 1180 | — | — | None | GA | — | 3500 N | 7 | 14 | 1 |
| 6 | C | 1277 | Q | 590 | — | — | GA | GI | — | 3500 N | 7 | 14 | 1 |
| 7 | D | 1087 | N | 980 | — | — | None | None | — | 3500 N | 7 | 14 | 1 |
| 8 | E | 1088 | P | 1180 | N | 980 | GA | GA | GA | 3500 N | 7 | 14 | 1 |
| 9 | F | 1102 | R | 1470 | P | 1180 | None | GA | None | 3500 N | 7 | 14 | 1 |
| 10 | G | 1056 | N | 980 | — | — | None | GI | — | 3500 N | 7 | 14 | 1 |
| 11 | H | 1022 | Q | 590 | — | — | None | None | — | 3500 N | 7 | 14 | 1 |
| 12 | I | 1121 | N | 980 | — | — | None | GA | — | 3500 N | 7 | 14 | 1 |
| 13 | J | 1192 | N | 980 | — | — | None | GA | — | 3500 N | 7 | 14 | 1 |
| 14 | K | 788 | N | 980 | — | — | None | None | — | 3500 N | 7 | 14 | 1 |
| 15 | L | 1225 | N | 980 | — | — | None | GA | — | 3500 N | 7 | 14 | 1 |
| 16 | M | 1095 | N | 980 | — | — | None | None | — | 3500 N | 7 | 14 | 1 |
| 17 | S | 1245 | N | 980 | — | — | GA | None | — | 3500 N | 7 | 16 | 5 |

| | Hardness measurement of resistance weld | | | | | | Average grain size of HAZ (μm) | Area ratio of retained γ (%) | Evaluation of Weld Fracture form ○: Plug fracture (Excellent) Δ: Plug fracture (Good) X: Interface fracture (Poor) | Remarks |
|---|---|---|---|---|---|---|---|---|---|---|
| Test piece No. | $HV_{BM}$ (Hv) | $HV_w$ (Hv) | $HV_{BM}/HV_w$ | $HV_{min}$ (Hv) | $HV_\alpha$ (Hv) | Hv ratio (%) | | | | |
| 1 | 501 | 440 | 1.14 | 370 | 367 | 101 | 1 | 31 | ○ | Example |
| 2 | 503 | 403 | 1.25 | 365 | 367 | 100 | 1 | 35 | ○ | Example |
| 3 | 489 | 277 | 1.77 | 345 | 367 | 94 | 1 | 34 | ○ | Example |
| 4 | 499 | 296 | 1.69 | 359 | 367 | 98 | 1 | 25 | ○ | Example |
| 5 | 498 | 422 | 1.18 | 376 | 401 | 94 | 1 | 26 | ○ | Example |
| 6 | 477 | 364 | 1.31 | 415 | 397 | 104 | 3 | 28 | Δ | Example |
| 7 | 481 | 398 | 1.21 | 398 | 337 | 118 | 2 | 42 | ○ | Example |
| 8 | 498 | 432 | 1.15 | 333 | 337 | 99 | 1 | 35 | ○ | Example |
| 9 | 512 | 461 | 1.11 | 345 | 341 | 101 | 1 | 48 | ○ | Example |
| 10 | 502 | 388 | 1.29 | 328 | 327 | 100 | 1 | 39 | ○ | Example |
| 11 | 489 | 375 | 1.30 | 313 | 316 | 99 | 1 | 42 | ○ | Example |
| 12 | 498 | 403 | 1.24 | 346 | 347 | 100 | 1 | 40 | ○ | Example |
| 13 | 500 | 431 | 1.16 | 369 | 370 | 100 | 1 | 38 | ○ | Example |
| 14 | 384 | 375 | <u>1.02</u> | 215 | 241 | <u>89</u> | 2 | 35 | X | Comp. Ex. |
| 15 | 410 | 398 | <u>1.03</u> | 350 | 381 | 92 | <u>7</u> | 33 | X | Comp. Ex. |
| 16 | 465 | 431 | <u>1.08</u> | 314 | 339 | 93 | <u>4</u> | 35 | X | Comp. Ex. |
| 17 | 459 | 405 | 1.13 | 364 | 355 | 103 | 3 | 32 | Δ | Example |

Note 1:
Values outside the range of the present invention are underlined.

Note 2:
$HV_\alpha(Hv)$ = (tensile strength of the high-strength steel sheet having certain composition before the resistance welding (MPa) − 30)/3.14 (1)

Note 3:
Hv ratio (%) = $HV_{min}/HV_\alpha \times 100$ (2)

In the Inventive Examples (Test piece Nos. 1 to 13, 17), the steel sheet α has all achieved a tensile strength of more than 900 MPa, $HV_{BM}/HV_W$ of 1.1 or more, a HAZ grain size of 3 μm or less, and Hv ratio of 90% or more. Furthermore, the fracture form is effective for the judgment of the stability of the cross tensile strength of the spot welded joint. In the resistance spot welded joints of the steel sheets of the Inventive Examples (Test piece Nos. 1 to 13), the plug fracture was all obtained in the cross tensile test. In particu- On the other hand, in the Comparative Examples (Test piece Nos. 14 to 16) that do not satisfy the requirements according to aspects of the present invention, one or more of the conditions of $HV_{BM}/HV_W$ of 1.1 or more, HAZ grain size of 3 μm or less, Hv ratio of 90% or more was not achieved. Furthermore, in the Comparative Example (Test piece Nos. 14 to 16), all the fracture forms were the interface fractures.

REFERENCE SIGNS LIST

1 Lower steel sheet
2 Upper steel sheet
3 Steel sheet disposed between lower and upper steel sheets
4 Sheet set
5 Lower electrode tip
6 Upper electrode tip
7 Nugget
8 Heat affected zone

The invention claimed is:

1. An automotive member having a resistance weld for fixing two or more steel sheets including at least one high-strength steel sheet, the high-strength steel sheet including a composition containing, in mass %, C: 0.08 to 0.25%,
Si: 0.01 to 2.50%,
Mn: 3.89 to 8.1%,
Al: 0.01 to 1.50%,
N: 0.010% or less,
each of one or two of Ti: 0.010 to 0.10% and Nb: 0.010 to 0.10%,
the balance being Fe and unavoidable impurities, wherein
a maximum hardness ($HV_{BM}$) in a heat-affected zone of the resistance weld is at least 1.1 times hardness ($HV_W$) of a nugget in the resistance weld formed in a softest steel sheet of a sheet set during resistance welding,
an average grain size of a steel sheet structure of the heat-affected zone within 2 mm in a direction at a right angle to a sheet thickness from an end part of the nugget of the high-strength steel sheet is 3 μm or less, and
a minimum hardness ($HV_{min}$) in the heat-affected zone is at least 90% of hardness ($HV_\alpha$) of the high-strength steel sheet before the resistance welding.

2. The automotive member having a resistance weld according to claim 1, wherein the composition further contains, in mass %, one or more selected from the group of V: 0.05% or less,
B: 0.010% or less,
Cu: 0.50% or less,
Ni: 0.50% or less,
Cr: 0.50% or less,
Mo: 0.50% or less,
Ca: 0.0050% or less, and
REM: 0.0050% or less.

3. The automotive member having a resistance weld according to claim 1, wherein the high-strength steel sheet has a structure containing, in terms of an area ratio, 20 to 50% of retained austenite.

4. The automotive member having a resistance weld according to claim 1, the high-strength steel sheet includes a coating layer formed on a surface thereof.

5. The automotive member having a resistance weld according to claim 4, wherein the coating layer is a galvanized layer.

6. The automotive member having a resistance weld according to claim 4, wherein the coating layer is a galvannealed layer.

7. The automotive member having a resistance weld according to claim 2, wherein the high-strength steel sheet has a structure containing, in terms of an area ratio, 20 to 50% of retained austenite.

8. The automotive member having a resistance weld according to claim 2, the high-strength steel sheet includes a coating layer formed on a surface thereof.

9. The automotive member having a resistance weld according to claim 3, the high-strength steel sheet includes a coating layer formed on a surface thereof.

10. The automotive member having a resistance weld according to claim 7, the high-strength steel sheet includes a coating layer formed on a surface thereof.

11. The automotive member having a resistance weld according to claim 8, wherein the coating layer is a galvanized layer.

12. The automotive member having a resistance weld according to claim 9, wherein the coating layer is a galvanized layer.

13. The automotive member having a resistance weld according to claim 10, wherein the coating layer is a galvanized layer.

14. The automotive member having a resistance weld according to claim 8, wherein the coating layer is a galvannealed layer.

15. The automotive member having a resistance weld according to claim 9, wherein the coating layer is a galvannealed layer.

16. The automotive member having a resistance weld according to claim 10, wherein the coating layer is a galvannealed layer.

\* \* \* \* \*